United States Patent
Diamant et al.

(10) Patent No.: US 9,207,749 B2
(45) Date of Patent: Dec. 8, 2015

(54) MECHANISM FOR FACILITATING EFFICIENT OPERATIONS PATHS FOR STORAGE DEVICES IN COMPUTING SYSTEMS

(75) Inventors: Nimrod Diamant, Kfar Saba (IL); Ohad Falik, Kfar Saba (IL); Itay Franko, Herzlia (IL); Robert W. Strong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 13/596,880

(22) Filed: Aug. 28, 2012

(65) Prior Publication Data

US 2014/0068281 A1  Mar. 6, 2014

(51) Int. Cl.
*G06F 1/32* (2006.01)

(52) U.S. Cl.
CPC ........... *G06F 1/3268* (2013.01); *Y02B 60/1246* (2013.01)

(58) Field of Classification Search
CPC .................................. G06F 1/32; G06F 21/64
USPC .................................................. 713/1, 2, 300
See application file for complete search history.

(56) References Cited

U.S. PATENT DOCUMENTS

| | | | | |
|---|---|---|---|---|
| 5,345,347 A | * | 9/1994 | Hopkins et al. | 360/71 |
| 8,516,232 B2 | * | 8/2013 | Dolgunov et al. | 713/1 |
| 2005/0044433 A1 | * | 2/2005 | Dunstan | 713/320 |
| 2007/0192597 A1 | * | 8/2007 | Bade et al. | 713/167 |
| 2009/0172439 A1 | | 7/2009 | Cooper et al. | |
| 2009/0222680 A1 | | 9/2009 | Hirai | |
| 2010/0268967 A1 | * | 10/2010 | Senda | 713/193 |
| 2010/0313045 A1 | | 12/2010 | Olarig et al. | |
| 2013/0227267 A1 | * | 8/2013 | Senda | 713/2 |
| 2014/0181327 A1 | * | 6/2014 | Cohen et al. | 710/5 |

FOREIGN PATENT DOCUMENTS

| | | |
|---|---|---|
| EP | 1338947 A1 | 8/2003 |
| EP | 0679983 B1 | 11/2003 |

OTHER PUBLICATIONS

PCT/US2013/046865 "Notification of Transmittal of the International Search Report and the Written Opinion of the International Searching Authority, or the Declaration" mailed Nov. 28, 2013, 14 pages.

* cited by examiner

*Primary Examiner* — Vincent Tran
(74) *Attorney, Agent, or Firm* — Blakely, Sokoloff, Taylor & Zafman LLP

(57) ABSTRACT

A mechanism is described for facilitating efficient operations paths for storage devices in computing systems according to one embodiment of the invention. A method of embodiments of the invention includes identifying a request for power mode change at a storage device at a computing system. The request for power mode change indicates potential reduced power state of the storage device. The method may further include transferring context information at the storage device to a host memory at the computing system, in response to the first command, and saving the context information at the host memory, wherein the storage device is at reduced power state.

20 Claims, 5 Drawing Sheets

MECHANISM FOR FACILITATING EFFICIENT OPERATIONS PATHS FOR STORAGE DEVICES IN COMPUTING SYSTEMS

FIELD

Embodiments of the invention relate to messaging systems. More particularly, embodiments of the invention relate to a mechanism for facilitating efficient operations paths for storage devices in computing systems.

BACKGROUND

Wear leveling is a well-known technique for extending erasable computer storage media lifetime, such as for Flash memory used in solid-state devices (SSDs) and universal serial bus (USB) Flash drives. For example, SSD includes an internal firmware that manages its wear leveling, such as by removing its data structures into its own flash and retrieving thereafter. However, these hibernation and resumption processes can consume a great deal of time and power; for example, each process could take nearly 800 msec of time and about 2 W of power to complete. Moreover, in case of a sudden power-off without proper saving of the drive context, the drive's firmware requires and consumes additional time (of about 16 sec) and power (of about 2 W) for restoration and rebuilding of the lost drive context to maintain data consistency.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

Embodiments of a mechanism are provided for facilitating efficient operations (e.g., suspension/resumption) path for storage devices (also referred to as "derives") (e.g., SSDs) in computing devices. In one embodiment, a storage device's data structures ("context") are saved outside the device itself, such as at a host memory (e.g., random access memory (RAM), dynamic RAM (DRAM), etc.) of a computing device as opposed to at the storage device's own flash memory to provide an efficient and faster path that saves both power and time in performing various derive-related operations, such as suspend operation, resume operation, etc.

Embodiments of the invention provide for (1) reducing time spent in entering and exiting sleep states, improving overall platform residency in the lower power state; (2) reducing energy spent in the save and restore of, for example, SSD management data structures or context to improve energy efficiency of going to low power states; and (3) reducing the wear of SSD that may be caused by frequent save of the context on the flash. In one embodiment, host memory is used to receive transfer of context from the storage derive as the host memory in a particular platform may remain available as operation system preserves platform state in various power states even when some devices become idle and no longer in use. Examples of such power states include S0 (working), partial operation in S0 where device may be put to a low power mode, such as D3 slumber or hibernate, S1 (sleep), S2 (sleep), S3 (standby/sleep), etc., as prescribed and defined by Advanced Configuration and Power Interface (ACPI) specification serving as an open standard for device configuration and power management by the operating system. Further, the functionalities of the mechanism may be performed with the knowledge of the computing system's target state.

Figure 1:
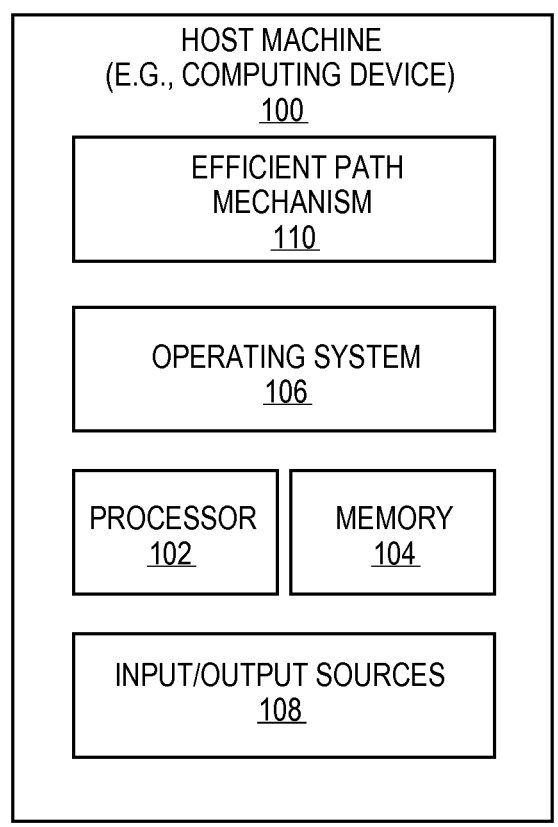
FIG. 1 illustrates a host machine employing a mechanism for facilitating efficient operations paths for storage devices according to one embodiment of the invention.

FIG. 1 illustrates a host machine 100 employing a mechanism for facilitating efficient operations paths for storage devices 110 according to one embodiment of the invention. Host machine includes a computing device, such as computing system 400 of FIG. 4) 100 is illustrated as having a mechanism for facilitating efficient path for suspension/resumption operations for storage device ("efficient path mechanism") 110. Computing device 100 may include mobile computing devices, such as cellular phones including smartphones (e.g., an iPhone® by Apple®, a BlackBerry® by Research In Motion®, etc.), other phones (e.g., landline phones), handheld computing devices, personal digital assistants (PDAs), etc., tablet computers (e.g., an iPad® by Apple®, a Galaxy 3® by Samsung®, etc.), laptop computers (e.g., notebooks, netbooks, Ultrabooks™, transformers, etc.), e-readers (e.g., a Kindle® by Amazon.com®, a Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", and the like, are used interchangeably and synonymously throughout this document.

Figure 2:
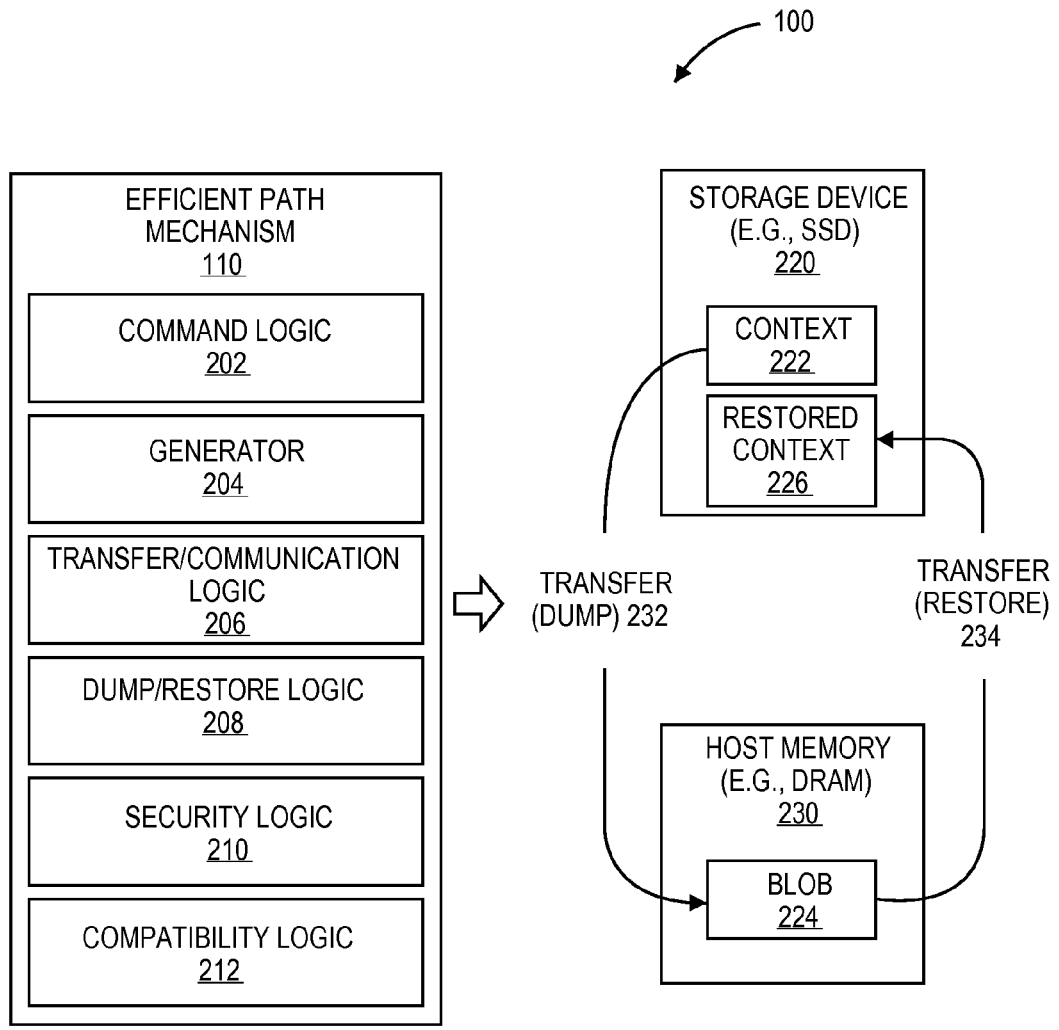
FIG. 2 illustrates an embodiment of a mechanism for facilitating efficient operations paths for storage devices at a computing device.

FIG. 2 illustrates an embodiment of a mechanism for facilitating efficient operations paths for storage devices 110 at a computing device 100. In one embodiment, efficient path mechanism 110 includes a number of components (also referred to as "modules" or "logic"), such as command logic 202, generator 204, communication logic 206, dump/restore logic 208, security logic 210, and compatibility logic 212.

Efficient path mechanism 110 may be employed at computing device 100 to facilitate efficient path for suspension and resumption operations involving storage device 220 (e.g., SSD drive) and host memory 230 (e.g., DRAM) at computing device 100 or similar computing system. Computing device 100 may further include basic input/output system (BIOS) to provide BIOS instructions. For example, parts of efficient path mechanism 110 may be provided as BIOS instructions, etc. In one embodiment, efficient path mechanism 110 along with BIOS instructions or driver controls the transfers 232, 234 of context 222 and binary large data (referred to as "blob") 224 between storage device 220 and host memory 230 as will be further described later in this document. Blob is further referred to as "basic large data", "BLOB", "BLOb", or "Blob". Storage device 220 and host memory 230 may be in communication with a platform controller hub (PCH) and one or more processors at computing device 100.

In one embodiment, when drive 220 becomes idle, command logic 202 may facilitate a modified storage driver that supports efficient path mechanism 110 to issue a novel device context command (e.g., DUMP DEVICE CONTEXT) instead of the conventional STANDBY IMMEDIATE command. This command may be implemented as a vendor-specific command over a connection or an interface, such as the Serial Advanced Technology Attachment (SATA). It is contemplated that embodiments are not limited to SATA and that other forms of connections, interfaces, etc., may be employed and used. Upon reception of the command at the drive firmware of storage device 220, generator 204 generates a blob 224 including context 222 of storage device 220. In alternate embodiments, the command may be generated in the SATA controller (which may be part of PCH or the like) using hardware state machine or other controllers that intercept the standard STANDABY IMMEDIATE command that the host may send. This hardware or firmware in the SATA controller may continue to perform other operations that otherwise a driver performs and are described below. In one embodiment, generator 204 may facilitate the drive firmware to generate the blob. The newly-generated blob may include one or more of: (1) context 222 including contents of the DRAM to be stored to be stored at host memory 230 as opposed to the flash of storage device 220; (2) anti-replay protect random number such as a NONCE (representing an arbitrary or random number used once to sign a cryptographic communication); (3) encryption; and (4) signature for authentication. In one embodiment, security logic 210 provides security and authentication (e.g., cryptographic encryption, decryption, security signatures, etc.) of the blob 224 to prevent any exposure or read of data by any kind of host software or other attacks that may attempt to modify or reuse without it being detected by the drive firmware of storage device 220. Communication logic 206 transfers blob 224 having encrypted and secured context 222 to host memory 230 to be saved there, while the storage drive 230 prepares to be powered down.

Storage drive 230 may save blob 224 in an internal non-volatile memory including the keys used for the encryption and signature as well as, for example, the NONCE used against anti-replay, and the like. Additionally, dump/restore logic 208 may insert a flag into or associate it with blob 224 to indicate that at next power-up, blob 224 should not re-load the DRAM from flash at storage drive 220 but instead, it should wait for blob 224 to be restored from host memory 230. Once blob 224 is properly stored at host memory 224 as facilitated by dump/restore logic 208, the dumb command, DUMP DEVICE CONTEXT, is satisfied and the storage drive 220 powers down. This power down may not need further delay as drive context 222 is securely preserved as blob 224 at host memory system 230 that is still available as the operating system keeps running. As aforementioned, blob 224 may not be understood by any host software or any other software due to its secured encryption so that blob 224 may not be altered or re-used without being noticed by storage drive 220 when, for example, attempting to re-load it.

At a later stage, when storage drive 220 is needed again, the operating system powers up the drive 220 and at this power-up, the storage drive firmware detects that need as the internal non-volatile flag is set which means that the driver's context 222 is about to be restored from host memory 230 as facilitated by dump/restore logic 208. Once storage drive 220 is powered up and stable, command logic 202 issues a restore command (e.g., RESTORE DEVICE CONTEXT) to storage derive 220 which then triggers and is followed by blob 224 being transferred 234 over to storage drive 220 as restored context 226 as facilitated by communication logic 206. Upon completion of the transfer 234, security logic 210 may facilitate the drive firmware to authenticate the contents of the blob 224 and check it against any replay attacks before the contents can be restored at storage drive 220. If the contents are determined to be valid, it decrypts the data back into is memory as restored context 222. Once the restoration is completed at storage drive 220, the drive's firmware may respond successfully to host commands and resume its operation with normalcy.

It is contemplated that any cryptographic methods employed and used by security logic 210 may be one of existing methods and algorithms, such as an Advanced Encryption Standard (AES) method for signing and encrypting with keys that have various strengths (e.g., size), while the decryption may be done in blocks directly to host memory 230 and be identified as valid only when all parts of the restored context are identified as valid and verified against replay attacks. Embodiments of the invention may be used with drives (e.g., SSD drives) that utilize Opal encryption and drives 220 that are password protected as the drive context 222 is fully saved and restored 226 with both the drive 220 and the OS driver support this capability and its related commands while the system memory 230 remains available.

Embodiments of the invention are not limited to this illustration and, for example, various embodiments may be used in S0-to-S3-to-S0 flow and other such combinations may be applicable with simply modifications to one or more components 202-212 of efficient path mechanism 110 and other system resources, such as a modification at the OS infrastructure level and/or to the BIOS to have OS storage driver communicate the blob buffer location to the BIOS for an S3 exit. For example, a low power mode may be entered even when the computing system is in state S0, in response to long idle durations or specific indications by the operating system of an inactivity window is expected. Further, embodiments of the invention may be used with SSD drives that are attached to various interfaces, such as SATA, Peripheral Component Interconnect Express (PCIe) and other type or form of interface that, for example, allows command-based communication with the computing device 100.

It is contemplated that any number and type of components may be added to and/or removed from efficient path mechanism 110 to facilitate various embodiments of the invention including adding, removing, and/or enhancing certain features. For brevity, clarity, and ease of understanding of efficient path mechanism 110, many of the standard and/or known components, such as those of a computing device, are not shown or discussed here. It is contemplated that embodiments of the invention are not limited to any particular technology, topology, computing system, memory systems, architecture, and/or standard and are dynamic enough to adopt and adapt to any future changes.

Figure 3A:
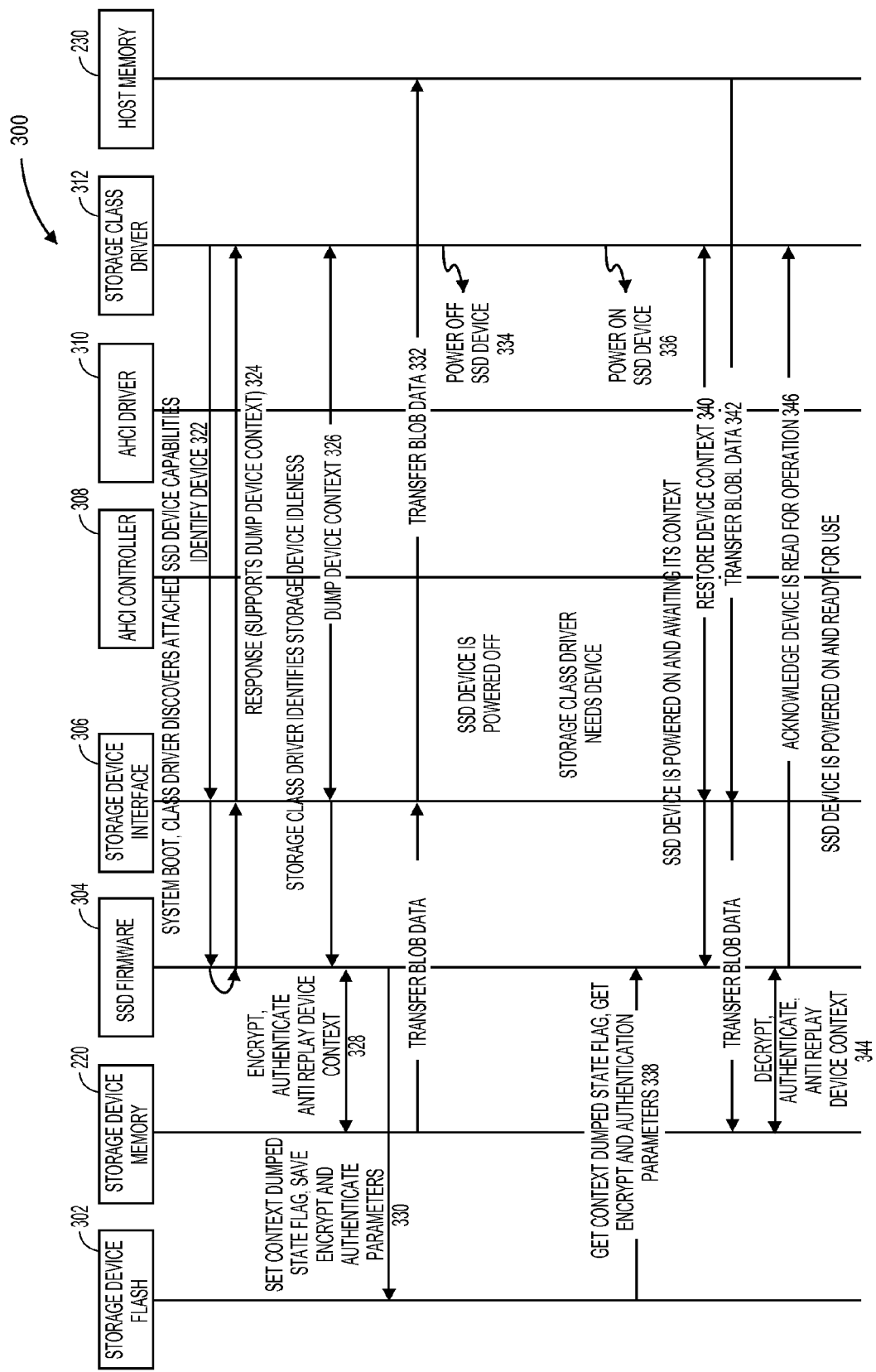
FIG. 3A illustrates a transaction sequence for facilitating efficient operations paths relating to a storage device at a computing device according to one embodiment of the invention.

FIG. 3A illustrates a transaction sequence 300 for facilitating efficient operations paths relating to a storage device 220 at a computing device according to one embodiment of the invention. Transaction sequence 300 may be performed by processing logic that may comprise hardware (e.g., circuitry, dedicated logic, programmable logic, etc.), software (such as instructions run on a processing device), or a combination thereof. In one embodiment, method 300 may be performed by efficient path mechanism 110 of FIG. 1.

At system (re)boot, storage class driver 312 discovers an attached storage drive (e.g., SSD drive) and its capabilities and consequently, storage drive 220 is identified 322 through derive firmware 304. In one embodiment, upon identification 322, a response 324 is provided in the form of a dump command 326, such as DUMP DEVICE CONTEXT, while the storage class driver 312 identifies storage drive idleness. Any data structures or context of the storage device 220 is encrypted and authenticated as an anti-replay device context 328 and further, the storage drive's context is set to be dumped with a state flag and saved encryption and authentication parameters 330 and formed into a blob of data. In one embodiment, the blob of data is transferred 32 from the storage device 220 to the host memory 230 (as opposed to being, conventionally, transferred to the storage device's flash 302). At this point, once the blob is saved and settled at the host memory 230, the storage device 220 is powered off 334.

Upon the storage class driver 312 needing the storage device 220, the storage device 220 is powered on 336. Upon powering on, the storage device 220 needs its context back so contents of the blob are to be transferred upon the associated state flag being triggered along with its encryption and authentication parameters 338 being verified for security. Storage drive 220 is powered on and awaits its context so it may be restored and in one embodiment, via efficient path mechanism, a restore command, RESTORE DEVICE CONTEXT, is issued 340. The contents of the blob are transferred back 342 from the host memory 230 to the storage device 220. Prior to the storage device 220 receiving the contents the blob, the contents are decrypted and authenticated to remain as anti-replay device context 344. Once authenticated, the contents are adopted at storage device 220 as restored context. Storage device 220 is ready for operation is acknowledged 346 and is powered on, restores back its context and is ready for use.

Figure 3B:
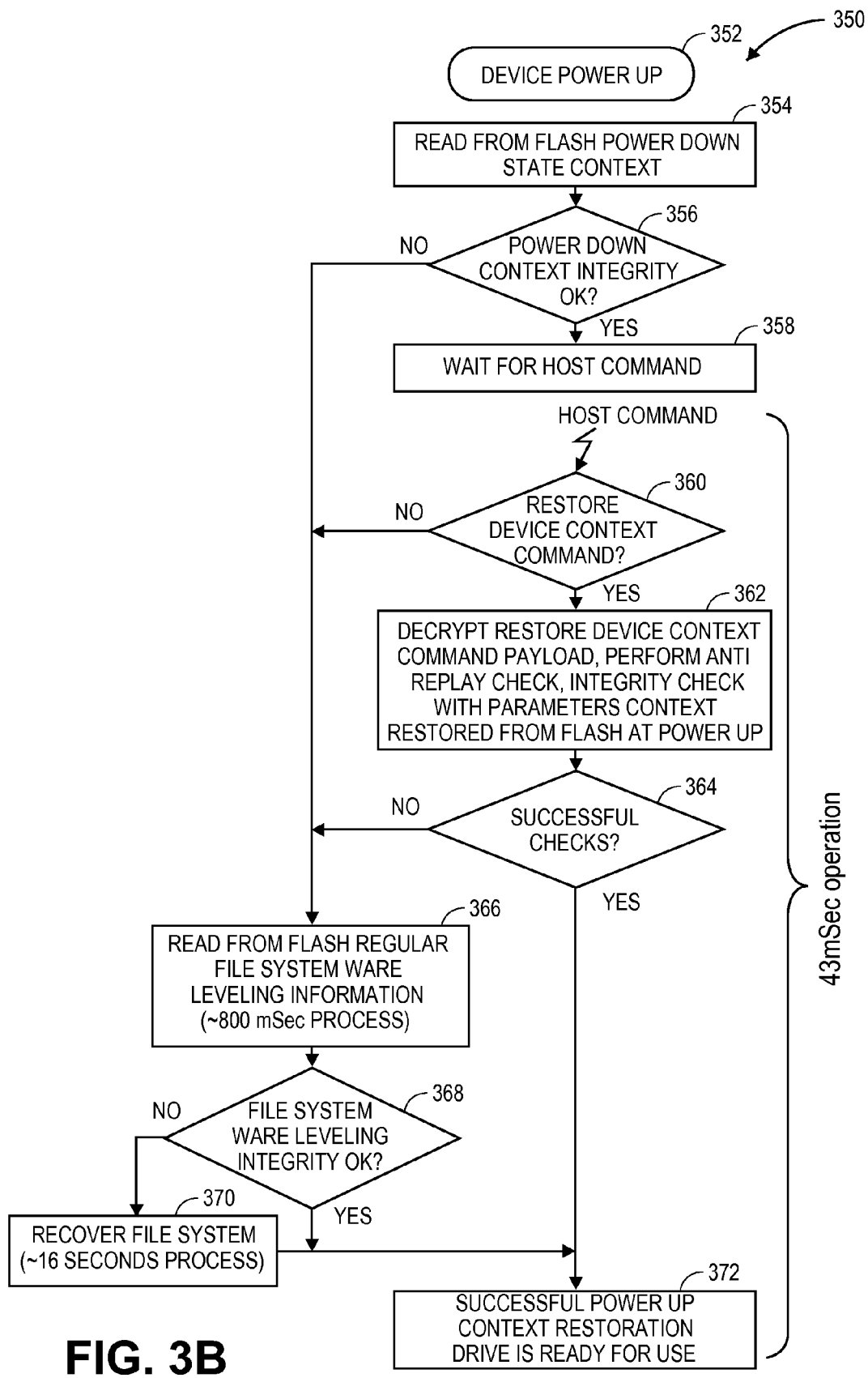
FIG. 3B illustrates a method for facilitating an efficient path for restore operation relating to a storage device at a computing device according to one embodiment of the invention.

FIG. 3B illustrates a method 350 for facilitating an efficient path for restore operation relating to a storage device at a computing device according to one embodiment of the invention. Methods 350 may be performed by processing logic that may comprise hardware (e.g., circuitry, dedicated logic, programmable logic, etc.), software (such as instructions run on a processing device), or a combination thereof. In one embodiment, method 300 may be performed by efficient path mechanism 110 of FIG. 1.

Method 350 begins with block 352 with a storage device (e.g., SSD drive) is powered up at block 352 and it is read from flash power down state context at block 352. At block 356, a determination is made as to whether the blob (having the original context) at a host memory of the computing system is secured with a minimum integrity (e.g., it is encrypted and secure, etc.). If the context is secure enough, at block 358, the process waits for the host command (e.g., a restore command) and determines whether the restore command, RESTORE DEVICE CONTEXT, has been issued at block 360. In one embodiment, if the restore command has been received, at block 362, the contents of the blob is decrypted and other factors are verified, such as an anti-replay check is performed, an integrity check on the contents of the blob is performed with parameters context restored from flash at power up of the storage device. At block 364, a determination is made as to whether all the checks were successfully performed. If yes, a successful power up of the storage device is performed and its context is ready and restored to be used again. In one embodiment, the aforementioned novel processes merely take, for example, 43 mSec to operate. It is contemplated that embodiments are not limited to 43 mSec or the number and type of processes as with any changes to any of the components 202-212 of efficient path mechanism 110 as shown in FIG. 2 and/or depending on the types and resources of storage devices, host memory, computing systems, etc., these processes, time savings, power savings, etc., may also change, accordingly.

Referring back to blocks 356, 360 and 364, if the answer to any of the decision processes is negative, the context is read from a flash regular file system ware leveling information at block 366. At block 368, a determination is made as to whether the integrity of wear leveling is good enough and secure. If not, the file is recovered at block 370. If yes, a power up of the storage device is performed with a successful restoration of its context at block 372.

Figure 4:
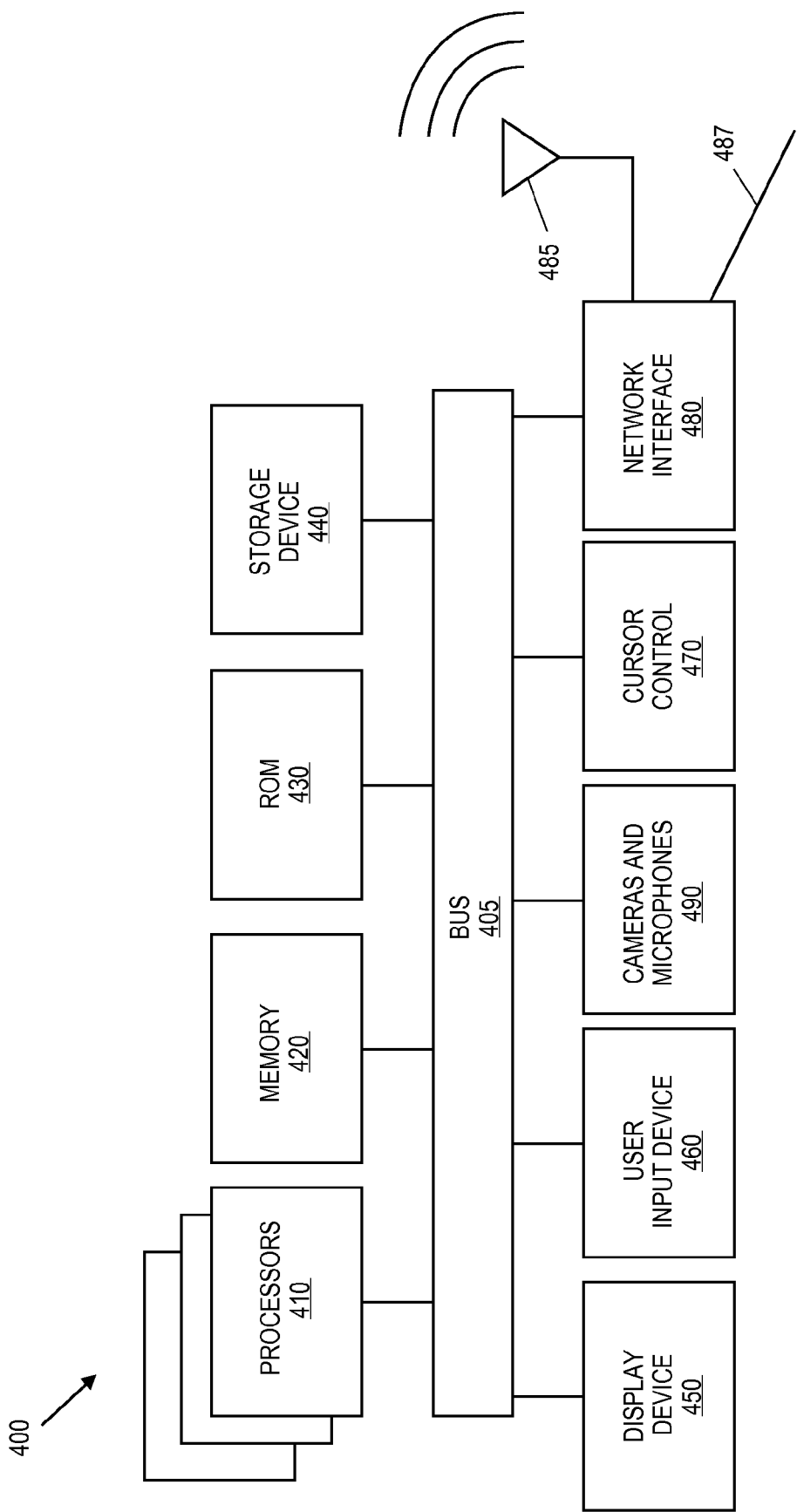
FIG. 4 is block diagram of a computer system suitable for implementing embodiments of the present disclosure according to one embodiment of the invention.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450.

Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), wide area network (WAN), metropolitan area network (MAN), personal area network (PAN), Bluetooth, an intranet, the Internet, etc. Network interface(s) 480 may include, for example, a wireless network interface having antenna 485, which may represent one or more antenna (e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments. Specifics in the examples may be used anywhere in one or more embodiments. The various features of the different embodiments may be variously combined with some features included and others excluded to suit a variety of different applications. Some embodiments pertain to a method comprising identifying a request for power mode change at a storage device at a computing system, wherein the request for power mode change indicates potential reduced power state of the storage device; transferring context information at the storage device to a host memory at the computing system, in response to the first command; and saving the context information at the host memory, wherein the storage device is at reduced power state.

Embodiments include any of the above methods further comprising: identifying a power change at the storage device, wherein the power change indicates powering on of the storage device, wherein following the power change; transferring, from the host memory, contents of the blob having the context back to the storage device; and restoring the context information as restored context at the storage device.

Embodiments include any of the above methods further comprising generating the blob having the context, wherein the context is encrypted prior to the context being transferred as the blob to the host memory.

Embodiments include any of the above methods further comprising decrypting the contents of the blob prior to them being transferred as the restored context to the storage device.

Embodiments include any of the above methods wherein the first command comprises a dump command.

Embodiments include any of the above methods wherein the second command comprises a transfer command.

Embodiments include any of the above methods wherein the storage memory comprises a solid-state drive (SSD) including a flash memory, and wherein the host memory comprises a dynamic random access memory (DRAM).

In another embodiment, an apparatus comprises: first logic to identify a request for power mode change at a storage device at a computing system, wherein the request for power mode change indicates potential reduced power state of the storage device; second logic to transfer context information at the storage device to a host memory at the computing system, in response to the first command; and third logic to save the context information at the host memory, wherein the storage device is at reduced power state.

Embodiments include the apparatus above wherein the first logic is further to identify a power change at the storage device, wherein the power change indicates powering on of the storage device, wherein following the power change; the second logic is further to transfer, from the host memory, contents of the blob having the context back to the storage device; and the third logic is further to restore the context information as restored context at the storage device.

Embodiments include the apparatus above wherein the efficient path mechanism further comprises fifth logic to generate the blob having the context, wherein the context is encrypted prior to the context being transferred as the blob to the host memory.

Embodiments include the apparatus above wherein the fifth logic is further to decrypt the contents of the blob prior to it being transferred as the restored context back to the storage device.

Embodiments include the apparatus above wherein the first command comprises a dump command.

Embodiments include the apparatus above wherein the second command comprises a transfer command.

Embodiments include the apparatus above wherein the storage memory comprises a solid-state drive (SSD) including a flash memory, and wherein the host memory comprises a dynamic random access memory (DRAM).

In another embodiment, a system comprises: a computing device having a memory to store instructions, and a processing device to execute the instructions, wherein the instructions cause the processing device to detect a first power change at a storage device at a computing system, wherein the first power change indicates powering off of the storage device; receive a first command to move context at the storage device; transfer the context at the storage device to a host memory at the computing system, in response to the first command, wherein the context is transferred as a blob; and save a blob having context at the host memory, wherein the storage device is powered off.

Embodiments include the system above wherein the processing device is further to: detect a second power change at the storage device, wherein the second power change indicates powering on of the storage device; receive a second command to move the context back to the storage device; transfer, from the host memory, contents of the blob having the context back to the storage device; and save the contents of the blob as restored context at the storage device, wherein the storage device is powered on.

Embodiments include the system above wherein processing device is further to generate the blob having the context, wherein the context is securely encrypted prior to the context being transferred as the blob to the host memory.

Embodiments include the system above wherein processing device is further to decrypt the contents of the blob prior to it being transferred as the restored context back to the storage device.

Embodiments include the system above wherein the first command comprises a dump command.

Embodiments include the system above wherein the second command comprises a transfer command.

Embodiments include the system above wherein the storage memory comprises a solid-state drive (SSD) including a flash memory, and wherein the host memory comprises a dynamic random access memory (DRAM).

In another embodiment, an apparatus comprises means for performing any one or more of the operations mentioned above.

A computing device arranged to perform a method according to any one or more of the operations mentioned above.

In yet another embodiment, at least one machine-readable medium comprising a plurality of instructions that in response to being executed on a computing device, causes the computing device to carry out a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   identifying a request for power mode change at a storage device at a computing system, wherein the request for power mode change indicates potential reduced power state of the storage device;
   detecting a first command representing a dump command;
   directly transferring context associated with the storage device to a host memory, in response to the first command, wherein the context is part of binary large data ("blob") that is generated at the host memory in response to the first command and to accept the context, wherein the blob further hosts at least one of contents of the host memory, random numbers to sign cryptographic communications, encrypted data, and signature for authentication, wherein first command triggers the direct transferring of the context to the host memory without having to hold the context in a standby mode in response to one or more intermediate commands; and saving the context at the host memory, wherein the storage device is at reduced power state, wherein the blob having the context is encrypted at the host memory, wherein the context is encrypted as an anti-replay context to protect against accidental use or alteration if one or more reload attempts are made by the storage device prior to issuance of a second command including a restore command.

2. The method of claim 1, further comprising:
identifying a power change at the storage device, wherein the power change indicates powering on of the storage device;
detecting the second command having the restore command, wherein detecting includes setting an internal non-volatile flag to indicate a demand for restoration of the context at the storage device;
directly transferring, in response to the restore command, contents of the blob having the context from the host memory back to the storage device, wherein the blob including the context is decrypted to be restored at the storage device; and
restoring the context as a restored context at the storage device.

3. The method of claim 1, wherein the storage memory comprises a solid-state drive (SSD) including a flash memory, and wherein the host memory comprises a dynamic random access memory (DRAM).

4. The method of claim 1, wherein the context comprises data structures associated with the storage device, wherein first command is issued in response to a change is power state at the computing device, wherein the power state comprises at least one of sleep, hibernate, slumber, standby, work, and awake.

5. The method of claim 1, wherein the first and second commands include vender-specified commands communicated over a connection or an interface including Serial Advanced Technology Attachment (SATA).

6. An apparatus comprising:
first logic to identify a request for power mode change at a storage device at a computing system, wherein the request for power mode change indicates potential reduced power state of the storage device,
wherein the first logic is further to detect a first command representing a dump command;
second logic to directly transfer context associated with the storage device to a host memory, in response to the first command, wherein the context is part of binary large data ("blob") that is generated at the host memory in response to the first command and to accept the context, wherein the blob further hosts at least one of contents of the host memory, random numbers to sign cryptographic communications, encrypted data, and signature for authentication, wherein first command triggers the direct transferring of the context to the host memory without having to hold the context in a standby mode in response to one or more intermediate commands; and
third logic to save the context at the host memory, wherein the storage device is at reduced power state, wherein the blob having the context is encrypted at the host memory, wherein the context is encrypted as an anti-replay context to protect against accidental use or alteration if one or more reload attempts are made by the storage device prior to issuance of a second command including a restore command.

7. The apparatus of claim 6, wherein the first logic is further to identify a power change at the storage device, wherein the power change indicates powering on of the storage device;
wherein the second logic is further to detect the second command having the restore command, wherein detecting includes setting an internal non-volatile flag to indicate a demand for restoration of the context at the storage device;
wherein the third logic is further to directly transfer, in response to the restore command, contents of the blob having the context from the host memory back to the storage device, wherein the blob including the context is decrypted to be restored at the storage device; and
wherein the fourth logic to restore the context as a restored context at the storage device.

8. The apparatus of claim 6, wherein the storage memory comprises a solid-state drive (SSD) including a flash memory, and wherein the host memory comprises a dynamic random access memory (DRAM).

9. The apparatus of claim 6, wherein the context comprises data structures associated with the storage device, wherein first command is issued in response to a change is power state at the computing device, wherein the power state comprises at least one of sleep, hibernate, slumber, standby, work, and awake.

10. The apparatus of claim 6, wherein the first and second commands include vender-specified commands communicated over a connection or an interface including Serial Advanced Technology Attachment (SATA).

11. A system comprising:
a computing device having a memory to store instructions, and a processing device to execute the instructions, wherein the instructions cause the processing device to:
identify a request for power mode change at a storage device at a computing system, wherein the request for power mode change indicates potential reduced power state of the storage device;
detect a first command representing a dump command;
directly transfer context associated with the storage device to a host memory, in response to the first command, wherein the context is part of binary large data ("blob") that is generated at the host memory in response to the first command and to accept the context, wherein the blob further hosts at least one of contents of the host memory, random numbers to sign cryptographic communications, encrypted data, and signature for authentication, wherein first command triggers the direct transferring of the context to the host memory without having to hold the context in a standby mode in response to one or more intermediate commands; and
save the context at the host memory, wherein the storage device is at reduced power state, wherein the blob having the context is encrypted at the host memory, wherein the context is encrypted as an anti-replay context to protect against accidental use or alteration if one or more reload attempts are made by the storage device prior to issuance of a second command including a restore command.

12. The system of claim 11, wherein the processing device is further to:
identify a power change at the storage device, wherein the power change indicates powering on of the storage device;

detect the second command having the restore command, wherein detecting includes setting an internal non-volatile flag to indicate a demand for restoration of the context at the storage device;

directly transfer, in response to the restore command, contents of the blob having the context from the host memory back to the storage device, wherein the blob including the context is decrypted to be restored at the storage device; and restore the context as a restored context at the storage device.

13. The system of claim 11, wherein the storage memory comprises a solid-state drive (SSD) including a flash memory, and wherein the host memory comprises a dynamic random access memory (DRAM).

14. The system of claim 11, wherein the context comprises data structures associated with the storage device, wherein first command is issued in response to a change is power state at the computing device, wherein the power state comprises at least one of sleep, hibernate, slumber, standby, work, and awake.

15. The system of claim 11, wherein the first and second commands include vender-specified commands communicated over a connection or an interface including Serial Advanced Technology Attachment (SATA).

16. At least one non-transitory machine-readable medium comprising a plurality of instructions that in response to being executed on a computing device, causes the computing device to carry out a method according to one or more operations comprising:

identifying a request for power mode change at a storage device at a computing system, wherein the request for power mode change indicates potential reduced power state of the storage device;

detecting a first command representing a dump command;

directly transferring context associated with the storage device to a host memory, in response to the first command, wherein the context is part of binary large data ("blob") that is generated at the host memory in response to the first command and to accept the context, wherein the blob further hosts at least one of contents of the host memory, random numbers to sign cryptographic communications, encrypted data, and signature for authentication, wherein first command triggers the direct transferring of the context to the host memory without having to hold the context in a standby mode in response to one or more intermediate commands; and saving the context at the host memory, wherein the storage device is at reduced power state, wherein the blob having the context is encrypted at the host memory, wherein the context is encrypted as an anti-replay context to protect against accidental use or alteration if one or more reload attempts are made by the storage device prior to issuance of a second command including a restore command.

17. The machine-readable medium of claim 16, wherein the one or more operations further comprise:

identifying a power change at the storage device, wherein the power change indicates powering on of the storage device;

detecting the second command having the restore command, wherein detecting includes setting an internal non-volatile flag to indicate a demand for restoration of the context at the storage device;

directly transferring, in response to the restore command, contents of the blob having the context from the host memory back to the storage device, wherein the blob including the context is decrypted to be restored at the storage device; and restoring the context as a restored context at the storage device.

18. The machine-readable medium of claim 16, wherein the storage memory comprises a solid-state drive (SSD) including a flash memory, and wherein the host memory comprises a dynamic random access memory (DRAM).

19. The machine-readable medium of claim 16, wherein the context comprises data structures associated with the storage device, wherein first command is issued in response to a change is power state at the computing device, wherein the power state comprises at least one of sleep, hibernate, slumber, standby, work, and awake.

20. The machine-readable medium of claim 16, wherein the first and second commands include vender-specified commands communicated over a connection or an interface including Serial Advanced Technology Attachment (SATA).

* * * * *